3,574,578
STEAM HYDROCARBON REFORMING PROCESS
William F. Franz, Gardiner, and Howard V. Hess, Glenham, N.Y., assignors to Texaco Inc., New York, N.Y.
Filed Dec. 28, 1967, Ser. No. 694,184
Int. Cl. C01b 2/14
U.S. Cl. 48—214
9 Claims

ABSTRACT OF THE DISCLOSURE

A low temperature method for the steam reforming of hydrocarbons using a zeolite containing catalyst to produce a gas containing hydrogen and carbon dioxide and substantially free from carbon monoxide.

Figure 1:
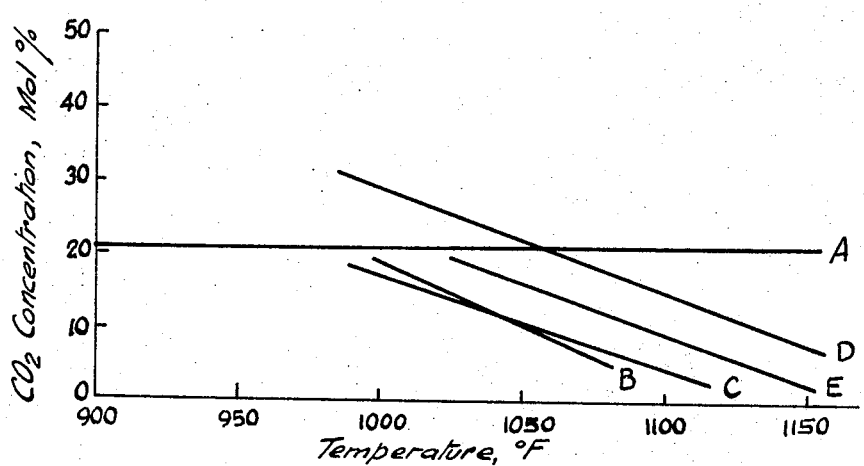

This invention relates to the conversion of hydrocarbons. More particularly, it is concerned with the catalytic conversion of low molecular weight hydrocarbons into gaseous products in the presence of steam.

The steam reforming of hydrocarbons is well known in the art. In a typical prior art process, a hydrocarbon liquid, for example, boiling up to about 600° F. is mixed with steam and the mixture passed through a furnace maintained at a temperature of about 1500–2000° F. to yield a product gas containing principally hydrogen and containing lesser amounts of carbon dioxide, carbon monoxide and gaseous hydrocarbons.

Since the reaction is carried out at high temperature and is highly endothermic, the reactants are passed through a plurality of catalyst-containing tubes situated in fired heaters wherein they are heated to reaction temperatures. These fired heaters are not completely satisfactory in that they are expensive to build and are of critical dimension since they may require a heat transfer of as much as 175,000 b.t.u. per hour per cubic foot of catalyst. Accordingly, it is difficult to control the temperature therein and hot spots can frequently develop. Furthermore, because of metallurgical limitations, the presence of hydrogen in the gas stream and the high temperatures involved, an upper practical pressure limit of about 400 p.s.i.g. placed on the equipment. Another disadvantage of the conventional processes is that at the high temperatures of the reaction, some carbon is formed which deposits on the catalyst thereby reducing the catalyst activity and requiring regeneration.

The product gas in conventional processes also contains a substantial amount of carbon monoxide which is particularly undesirable if the process is intended basically for the production of a hydrogenating gas. A typical product composition is $H_2$, 45–60%; $CO_2$, 8–15%; CO, 10–25% and hydrocarbons 15–40%. Accordingly, for hydrogen production the carbon monoxide containing product gas must be subjected to a shift conversion wherein the carbon monoxide is reacted with steam to produce additional hydrogen and carbon dioxide. Conventionally the shift conversion is carried out in a separate reactor using a different catalyst under different operating conditions.

It is therefore an object of the present invention to provide a method for the steam reforming of hydrocarbons at relatively low temperatures. Another object is to provide a method for the production of a gas rich in hydrogen and essentially free from carbon monoxide. Still another object of the present invention is to provide a method for the production of a gas which can act as a suitable substitute for heating gas. A still further object is to produce a gas which after being subjected only to a $CO_2$-removal scrubbing operation, is suitable for hydrogenating purposes.

These and other objects will be apparent to those skilled in the art from the following disclosure.

According to the present invention there is provided a process for the steam reforming of hydrocarbons which comprises passing a mixture of steam and a hydrocarbon into contact with a catalyst having a hydrogenating component supported on a crystalline zeolite containing base at a temperature between about 800 and 1200° F. to produce a gas containing hydrogen and carbon dioxide and substantially free from carbon monoxide.

The hydrocarbon charge to the process may comprise any hydrocarbon boiling up to about 600° F., preferably a hydrocarbon fraction in the $C_4$–400° F. range. The hydrocarbon feed stock should have a low sulfur content for example less than 100 p.p.m. sulfur, and preferably less than 10 p.p.m. sulfur. A particularly suitable charge stock is a light straight run naphtha which has been subjected to catalytic hydrodesulfurization.

The process of the present invention is carried out at relatively low temperatures. The processes of the prior art are ordinarily conducted at temperatures between about 1500 and 2000° F. The process of the present invention is carried out at a temperature between about 800 and 1200° F. and preferably between 850 and 1150° F. Preferably, the pressure may range from about 0 to 500 p.s.i.g., although pressures ranging up to 2000 p.s.i.g. and higher may be used.

The steam hydrocarbon ratio, that is the number of moles of steam per atom of carbon in the hydrocarbon feed, may range between 2 and 6, a preferred range being from 2–4. Although a higher steam carbon ratio apparently does not affect the reaction per se, it does affect the economics by reducing the contact or residence time of the hydrocarbon thereby reducing the amount of product gas per unit of time. High steam ratios also increase the heat load for the process.

The catalyst used in the process of this invention comprises a hydrogenating component supported on a crystalline zeolite containing base. Advantageously the zeolite may be diluted with an amorphous inorganic oxide for example silica, alumina, magnesia, zirconia and mixtures thereof. Supports containing up to 85% amorphous inorganic oxides have been found satisfactory.

The crystalline zeolite should have uniform pore openings ranging from 6 to 14 angstrom units and should have a low alkali metal content. Zeolites are generally considered to be a three dimensional framework of silica and alumina tetrahedra which are closely linked by the sharing of oxygen atoms. They are generally represented by the formula

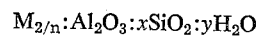

$$M_{2/n}:Al_2O_3:xSiO_2:yH_2O$$

where M is a cation, $n$ represents the valence of the cation, $x$ represents the moles of silica and $y$ represents the moles of water. Naturally occurring zeolites such as mordenite, analcite, and chabazite may be used as may synthetic zeolites such as zeolite X, zeolite Y and zeolite D. Naturally occurring zeolites usually contain both alkali and alkaline earth metals whereas synthetic zeolites usually only contain the alkali metal, generally sodium. To reduce the alkali metal content, the zeolite may be subjected to ion exchange using a solution of an ammonium compound to convert the zeolite at least partially to the ammonium form. Heating then drives off ammonia to convert the zeolite to the hydrogen form. This treatment may be repeated to further reduce the alkali metal content of the zeolite. However to produce a zeolite of extremely low alkali metal content the once ion-exchanged material, having been heated to convert it to the hydrogen form, is then calcined for several hours at a temperature of at least about 1000° F. and the ion exchange is then repeated followed by a second heating and calcination.

This treatment produces a zeolite having an alkali metal content of less than 0.1% and also having high activity, good physical ruggedness and steam stability.

The hydrogenating component of the catalyst comprises a Group VIII hydrogenating metal or compound thereof optionally used in conjunction with a Group VI metal or compound thereof. Group VIII hydrogenating metals comprise members of the iron group, namely iron, nickel and cobalt and noble metals such as platinum, palladium, rhodium, and iridium. Group VI metals include chromium and molybdenum. When the hydrogenating components of the catalyst are non-noble in kind they may be present (as metal) in an amount ranging from 10 to 50% by weight of the total catalyst composite, a range of 15–40% being preferred. When the hydrogenating component comprises a noble metal it may be present in an amount ranging between 0.01 and 10% by weight based on the catalyst composite, a preferred amount being 0.1–2.5%. Preferred catalysts comprise a mixture of nickel and iron and an outstanding catalyst comprises a mixture of nickel and chromium.

The method of impregnating or depositing the hydrogenating component on the support forms no part of the invention. Such impregnation and deposition techniques are well known in the art and need no description here. Preferably, if the zeolite is to be diluted with amorphous inorganic oxides, such dilution is carried out before the impregnation. Advantageously, the catalyst is prereduced just prior to use.

The following examples are submitted for illustrative purposes only.

EXAMPLE 1

In this example, catalyst A contains 16% NiO and 14% $Cr_2O_3$ supported on a mixture of 5% silica and the balance alumina. Catalyst B contains 16% NiO and 14% $Cr_2O_3$ supported on a mixture of 22.5% twice ion-exchanged, twice calcined zeolite Y (as described above) and 77.5% silica-alumina (85% silica, 15% alumina). The charge is an aromatic rich hydrocarbon liquid having a boiling range of 230–350° F. and a sulfur content of less than 10 p.p.m. Reaction conditions and other data are tabulated below.

TABLE 1

| Catalyst | A | B |
|---|---|---|
| Temperature, °F | 901 | 899 |
| Pressure, p.s.i.g | 100 | 100 |
| Hydrocarbon feed, v./v./hr | 0.51 | 0.56 |
| Water feed, v./v./hr | 0.65 | 0.63 |
| Mol steam/mol hydrocarbon feed | 9.5 | 9.2 |
| Gas yield, v./v./hr | 37 | 114 |
| Product gas composition, vol. percent: | | |
| $H_2$ | 97.6 | 71.8 |
| $CO_2$ | 1.1 | 19.7 |
| CO | Nil | Nil |
| Hydrocarbons | 0.5 | 4.7 |

This example shows that with a prior art type catalyst, the only reaction under the above conditions is dehydrogenation whereas, in our process, the larger volume of product gas and the production of hydrogen and $CO_2$ indicate that reforming takes place.

EXAMPLE 2

This example is similar to Example 1 except that both catalysts contain 20% NiO as the hydrogenation component. Supports and charge stock are the same. Reaction conditions and other data appear below.

TABLE 2

| Catalyst | A | B |
|---|---|---|
| Temperature, °F | 1,006 | 1,002 |
| Pressure, p.s.i.g | 100 | 100 |
| Hydrocarbon feed, v./v./hr | 0.68 | 0.55 |
| Water feed, v./v./hr | 0.72 | 0.65 |
| Mol steam/mol hydrocarbon feed | 6.36 | 5.91 |
| Hydrocarbon conversion, wt. percent charge | 7.7 | 18.8 |
| $H_2O$ conversion, wt. percent charge | 2.5 | 37.3 |
| Gas yield, v./v./hr | 164 | 389 |
| Gas composition: | | |
| $H_2$ | 71.5 | 44.5 |
| $CO_2$ | 23.6 | 27.0 |
| CO | Nil | Nil |
| Hydrocarbon | 1.0 | 25.6 |

It is apparent from the above hydrocarbon and steam conversion data and the gas yield that catalyst B is much more active than catalyst A.

EXAMPLE 3

In this example, the relative activities of different catalysts over varying temperatures are shown. In each case, n-heptane is charged at 300 p.s.i.g., the hydrocarbon and water feed rates being 0.5 and 1.4 v./v./hr. respectively. Each catalyst has the same support namely 22.5% twice ion-exchanged, twice calcined zeolite Y and 77.5% silica alumina (85% silica, 15% alumina). The hydrogenating components are as follows:

(A) 16% NiO, 14% $Cr_2O_3$
(B) 20% NiO
(C) 15% NiO, 5% $Fe_2O_3$
(D) 10% NiO, 10% $Fe_2O_3$
(E) 5% NiO, 15% $Fe_2O_3$

Figure 2:
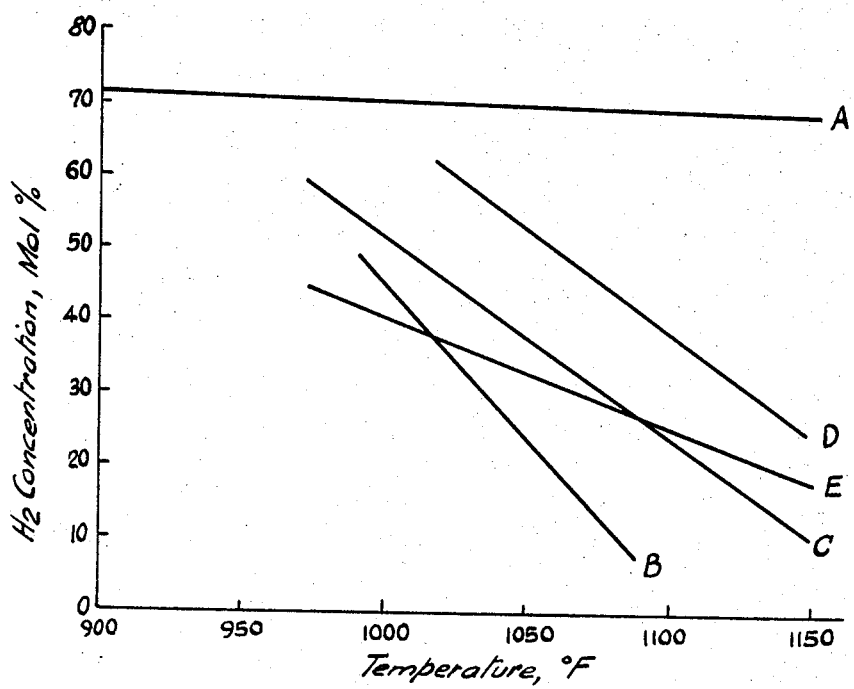

Plots of the $CO_2$ and hydrogen concentrations of the product gases as a function of the reaction temperature are shown in the accompanying drawing in FIG. 1 and FIG. 2, respectively. It is apparent that the NiO $Cr_2O_3$ catalyst is superior to the others.

EXAMPLE 4

A catalyst containing 16% NiO and 14% $Cr_2O_3$ supported on a base comprising 56% low sodium (0.2%) zeolite Y and 44% silica-alumina (85:15) is used for the reforming of a light hydrocarbon liquid having an end point of 210° F. Reaction conditions and other data appear below.

TABLE 3

| | |
|---|---|
| Temperature, °F. | 999 |
| Pressure, p.s.i.g. | 100 |
| Hydrocarbon feed, v./v./hr. | 0.68 |
| $H_2O$ feed, v./v./hr. | 0.63 |
| Mol steam/mol hydrocarbon feed | 7.6 |
| Hydrocarbon conversion, wt. percent | 43.6 |
| $H_2O$ conversion, wt. percent | 28.7 |
| Gas yield, v./v./hr. | 776 |
| Gas composition: | |
| $H_2$ | 68.0 |
| $CO_2$ | 12.8 |
| CO | Nil |
| Hydrocarbons | 19.0 |

EXAMPLE 5

In this example, a desulfurized light straight run naphtha is reformed over a catalyst containing 15% NiO, 5% $Fe_2O_3$ as the hydrogenating component on the same support as the catalyst of Example 4. Operating conditions and yield data are set forth below.

TABLE 4

| | |
|---|---|
| Temperature, °F. | 1001 |
| Pressure, p.s.i.g. | 308 |
| Hydrocarbon feed, v./v./hr. | 0.5 |
| Water feed, v./v./hr. | 1.19 |
| Mol steam/mol hydrocarbon feed | 21 |
| Gas yield, v./v./hr. | 247 |
| Gas composition: | |
| $H_2$ | 53.0 |
| $CO_2$ | 14.0 |
| CO | Nil |
| Hydrocarbons | 31.1 |

Obviously, many modifications and variations of the invention as hereinbefore set forth may be made without departing from the spirit and scope thereof, and therefore, only such limitations should be imposed as are indicated in the appended claims.

We claim:

1. A process for the steam reforming of hydrocarbons which comprises passing a mixture of steam and a hydrocarbon into contact with a catalyst having a hydrogenating component supported on a base comprising silica and a crystalline zeolite having an alkali metal content of less than 1.0 weight percent at a temperature between about 800° F. and 1200° F. to produce a gas consisting predominantly of hydrogen and carbon dioxide and substantially free from carbon monoxide.

2. The process of claim 1 in which the zeolite has an alkali metal content of less than 0.5%.

3. The process of claim 1 in which the zeolite has a uniform pore structure within the range of 6–14 A.

4. The process of claim 1 in which the base comprises zeolite, silica and alumina.

5. The process of claim 1 in which the hydrogenating component comprises a Group VIII metal.

6. The process of claim 1 in which the hydrogenating component comprises a Group VI metal.

7. The process of claim 5 in which the hydrogenating component comprises nickel.

8. The process of claim 7 in which the hydrogenating component comprises nickel and chromium.

9. The process of claim 2 in which the hydrogenating component comprises nickel and chromium.

References Cited

UNITED STATES PATENTS

| | | | |
|---|---|---|---|
| 3,329,628 | 7/1967 | Gladrow et al. | 252—459X |
| 3,351,566 | 11/1967 | Taylor et al. | 48—214X |
| 3,421,871 | 1/1969 | Davies | 252—470X |

MORRIS O. WOLK, Primary Examiner

R. E. SERWIN, Assistant Examiner

U.S. Cl. X.R.

48—197; 252—373, 455, 470